(12) United States Patent
Negoro et al.

(10) Patent No.: US 8,694,210 B2
(45) Date of Patent: Apr. 8, 2014

(54) SADDLE RIDING TYPE VEHICLE AND STEERING DAMPER DEVICE FOR USE IN SADDLE RIDING TYPE VEHICLE

(75) Inventors: Masanori Negoro, Shizuoka (JP); Nobuo Hara, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 34 days.

(21) Appl. No.: 13/185,557

(22) Filed: Jul. 19, 2011

(65) Prior Publication Data

US 2012/0022746 A1 Jan. 26, 2012

(30) Foreign Application Priority Data

Jul. 20, 2010 (JP) ................... 2010-162562

(51) Int. Cl.
- *A01B 69/00* (2006.01)
- *F16F 9/53* (2006.01)
- *B62K 1/00* (2006.01)

(52) U.S. Cl.
USPC ........ 701/42; 280/272; 188/267.2; 188/266.1

(58) Field of Classification Search
USPC .............. 701/41, 42; 280/272, 89; 188/267.1, 188/266.1, 267.2
See application file for complete search history.

(56) References Cited

U.S. PATENT DOCUMENTS

| | | | | |
|---|---|---|---|---|
| 4,811,807 A | * | 3/1989 | Schier | 180/421 |
| 6,422,126 B1 | | 7/2002 | Hamano et al. | |
| 6,547,043 B2 | * | 4/2003 | Card | 188/267.2 |
| 6,637,558 B2 | * | 10/2003 | Oliver et al. | 188/267.2 |
| 6,708,795 B2 | * | 3/2004 | Hasegawa et al. | 180/423 |
| 6,742,794 B2 | * | 6/2004 | Bunya et al. | 280/272 |
| 7,306,248 B2 | * | 12/2007 | Gogo et al. | 280/272 |
| 2003/0085086 A1 | * | 5/2003 | Oliver et al. | 188/267.1 |
| 2007/0176392 A1 | * | 8/2007 | Schiffer et al. | 280/272 |
| 2008/0251982 A1 | * | 10/2008 | Sekiya et al. | 267/140.14 |
| 2009/0071773 A1 | * | 3/2009 | Lun | 188/267.2 |
| 2009/0302557 A1 | | 12/2009 | Hara et al. | |

FOREIGN PATENT DOCUMENTS

| | | |
|---|---|---|
| JP | 05-201377 A | 8/1993 |
| JP | 06-171541 A | 6/1994 |
| JP | 11-180325 A | 7/1999 |
| JP | 2001-158369 A | 6/2001 |
| JP | 2001-341661 A | 12/2001 |
| JP | 2005-349927 A | 12/2005 |
| JP | 2007316299 A * | 12/2007 |
| JP | 2009-292258 A | 12/2009 |
| KR | 2005118405 A * | 12/2005 |

* cited by examiner

*Primary Examiner* — Behrang Badii
*Assistant Examiner* — Daniel L Greene
(74) *Attorney, Agent, or Firm* — Keating & Bennett, LLP

(57) ABSTRACT

A saddle riding type vehicle that reduces steering pull of a handle caused by a disturbance and also prevents degradation in a steering feeling includes a detector that detects a steering angle of a steering shaft, a steering damper, and a control device. The steering damper is arranged around the steering shaft and includes an electromagnet, a magnetic member, and a magnetic fluid stored in a gap between the electromagnet and the magnetic member. The control device includes a steering angular velocity determiner adapted to determine a steering angular velocity based on a steering angle detected by the detector, an instructor adapted to instruct a supply of current to the electromagnet for a first reference time when the determined steering angular velocity exceeds a first reference velocity and to instruct a stopping or reduction of the current supply after the first reference time elapses, and a driver that supplies the electromagnet with current in response to an instruction from the instructor.

6 Claims, 11 Drawing Sheets

CURRENT DETERMINING TABLE

| DAMPING FORCE VALUE (N) | CURRENT VALUE IO (A) |
| --- | --- |
| aaaa | AAAA |
| bbbb | BBBB |
| cccc | CCCC |
| .... | .... |

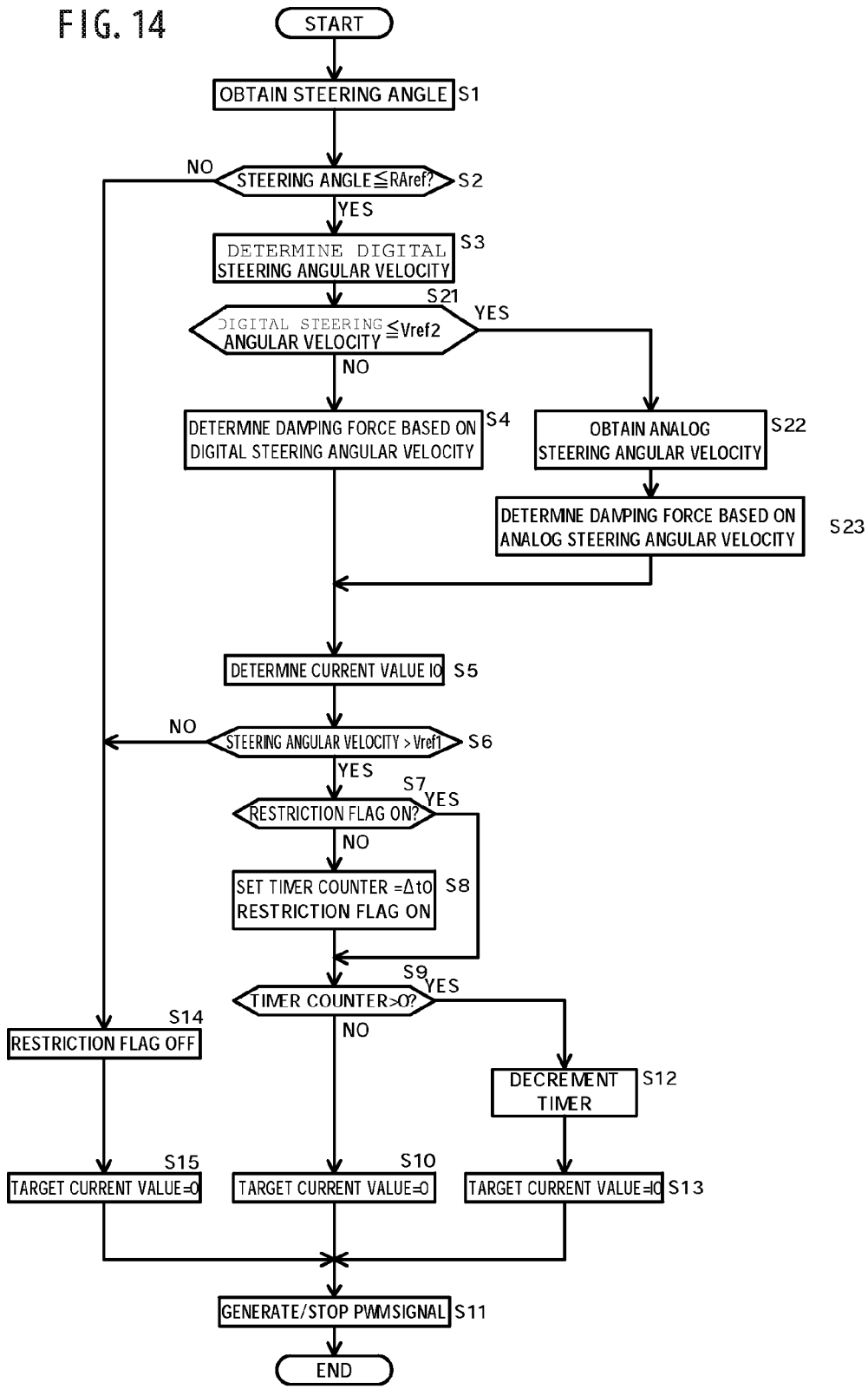

SADDLE RIDING TYPE VEHICLE AND STEERING DAMPER DEVICE FOR USE IN SADDLE RIDING TYPE VEHICLE

BACKGROUND OF THE INVENTION

1. Field of the Invention

The present invention relates to a saddle riding type vehicle and a steering damper device for use in a saddle riding type vehicle.

2. Description of the Related Art

A steering damper is used in a saddle riding type vehicle. The saddle riding type vehicle is, for example, an automobile, an all-terrain vehicle, or a snow mobile. The steering damper is adapted to damp the steering pull of a steering handle or steering wheel (hereinafter referred to as "handle").

JP 5-201377 A discloses a steering damper provided in a motorcycle. An object of the disclosed technique is to increase the damping force of a steering damper only during a disturbance. The steering damper disclosed in JP 5-201377 A includes a cylinder, a piston rod, and a piston. The piston rod is provided in the cylinder. The piston is provided at a tip end of the piston rod. The inside of the cylinder is partitioned into a first chamber and a second chamber. The first and second chambers are connected by a bypass. The first and second chambers store a fluid. When a load caused by a disturbance is imposed on the piston rod, a load sensor outputs a detection signal to a controller. The controller shuts down the bypass while the load exceeds a threshold level based on the detection signal. In this way, the damping force of the steering damper improves.

With the disclosed steering damper, however, a braking force (damping force) is exerted as long as the load exceeds the threshold level. Therefore, while the load exceeds the threshold level, it is difficult for the rider to operate the handle, which lowers the steering feeling of the motorcycle. More specifically, while braking force is exerted, the steering feels heavy to the rider.

SUMMARY OF THE INVENTION

Preferred embodiments of the present invention provide a saddle riding type vehicle that reduces a steering pull of a handle caused by a disturbance and degradation in a steering feeling.

The saddle riding type vehicle according to a preferred embodiment of the present invention includes a vehicle body frame, a head pipe, a steering shaft, a detector, a steering damper, and a controller. The head pipe is attached to a front end of the vehicle body frame. The steering shaft is provided rotatably in the head pipe. The detector detects a steering angle of the steering shaft. The controller controls the steering damper. The steering damper includes an electromagnet, a magnetic member, and a magnetic fluid. The electromagnet is arranged around the steering shaft and includes a first surface. The magnetic member is arranged around the steering shaft and includes a second surface opposed to the first surface of the electromagnet. The magnetic fluid is stored in a gap located between the first and second surfaces. The controller includes a steering angular velocity determiner, an instructor, and a driver. The steering angular velocity determiner determines a steering angular velocity based on the steering angle detected by the detector. The instructor instructs a supply of current to the electromagnet for a first reference time when the determined steering angular velocity exceeds a first reference velocity and instructs a stopping or reduction of the supply of current after the first reference time elapses. The driver supplies the electromagnet with current in response to an instruction from the instructor.

According to a preferred embodiment of the present invention, when the steering angular velocity exceeds a first reference velocity, braking force is exerted during the first reference time. Therefore, the saddle riding type vehicle according to a preferred embodiment of the present invention reduces the steering pull of the handle caused by a disturbance while reducing degradation in a steering feeling.

The instructor preferably instructs the driver to supply the electromagnet with current corresponding to the determined steering angular velocity.

The steering angular velocity determiner preferably determines the steering angular velocity for every second reference time which is shorter than the first reference time. The instructor further instructs the driver to stop or reduce the current supply when the determined steering angular velocity becomes less than the first reference velocity before the first reference time elapses after the current supply is started.

The instructor preferably further instructs the driver to stop or reduce the current supply when the detected steering angle is greater than a reference steering angle.

The detector preferably outputs a steering angle signal corresponding to a rotation of the steering shaft. The steering angular velocity determiner includes a sampler and a determiner. The sampler samples the steering angle signal in a reference cycle and obtains a plurality of steering angle values. The determiner determines a digital steering angular velocity based on the plurality of steering angle values. The controller further includes a differential circuit. The differential circuit differentiates the steering angle signal and outputs an analog steering angular velocity value. The instructor instructs the driver to supply current in magnitude corresponding to the digital steering angular velocity value when the digital steering angular velocity exceeds a second reference velocity that is higher than the first reference velocity and instructs the driver to supply current corresponding to the analog steering angular velocity value when the digital steering angular velocity value exceeds the first reference velocity and is less than the second reference velocity.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 14 is a flowchart for use in illustrating control processing by the control device shown in FIG. 12.

DETAILED DESCRIPTION OF THE PREFERRED EMBODIMENTS

Figure 1:
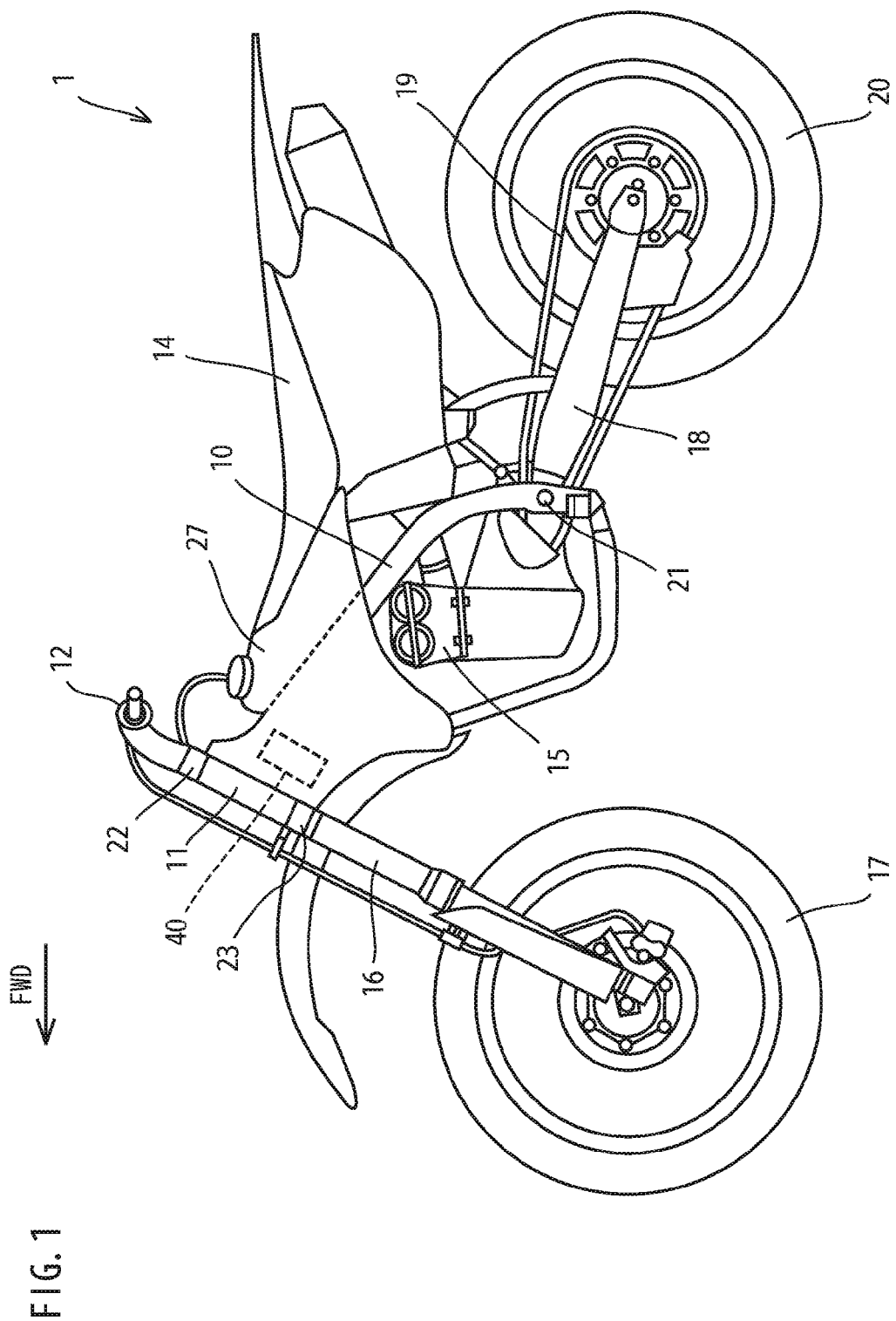
FIG. 1 is a side view of a saddle riding type vehicle 1 according to a first preferred embodiment of the present invention.

Now, preferred embodiments of the present invention will be described in detail in conjunction with the accompanying drawings, in which the same or corresponding portions are designated by the same reference characters and their description will not be repeated.

FIG. 1 is a left side view of a saddle riding type vehicle 1 according to a first preferred embodiment of the present invention when the vehicle faces its forward (FWD) direction. The "saddle riding type vehicle" may include, for example, a motorcycle, an ATV (All-Terrain Vehicle), and a snowmobile, or other vehicles. The "motorcycle" includes, for example, a scooter and a moped. The saddle riding type vehicle 1 shown in FIG. 1 preferably is an off-road motorcycle, for example. The off-road motorcycle is, for example, a motocrosser. As described above, the saddle riding type vehicle according to the preferred embodiment is not limited to such an off-road motorcycle.

The saddle riding type vehicle 1 includes a vehicle body frame 10, a head pipe 11, a handle 12, a seat 14, an engine 15, a pair of front forks 16, a front wheel 17, a rear arm 18, a chain 19, a rear wheel 20, and a fuel tank 27.

The head pipe 11 is attached at a front end of the vehicle body frame 10. The handle 12 is attached rotatably at an upper portion of the head pipe 11. The head pipe 11 is provided between the pair of front forks 16. The pair of front forks 16 extends downward from the head pipe 11. The front wheel 17 is attached rotatably at lower ends of the pair of front forks 16.

A pivot shaft 21 is provided at a rear portion of the vehicle body frame 10. The pivot shaft 21 is attached at a front end of the rear arm 18. The rear arm 18 is supported around the pivot shaft 21 so that it can swing up and down. The rear wheel 20 is attached rotatably at a rear end of the rear arm 18.

The seat 14 is provided above the vehicle body frame 10. The engine 15 is provided under the seat 14 and attached to the vehicle body frame 10. The chain 19 is provided between the engine 15 and the rear wheel 20 to transmit the motive power of the engine 15 to the rear wheel 20. The fuel tank 27 is provided between the head pipe 11 and the seat 14.

Figure 2:
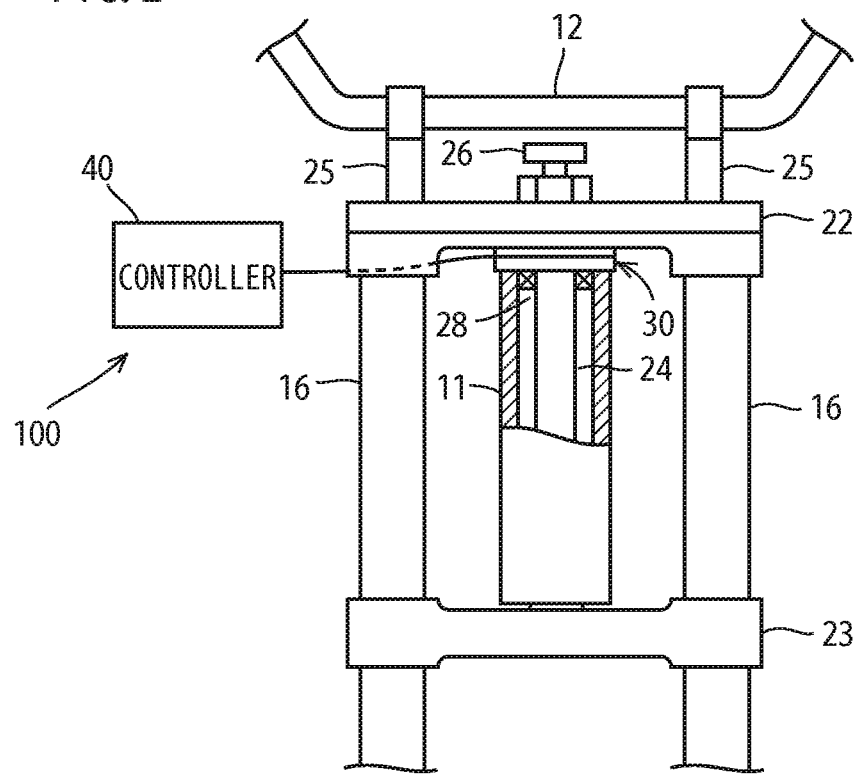
FIG. 2 is a front view of a head pipe and a periphery of the head pipe.

FIG. 2 is a front view of the head pipe 11 and its periphery. Referring to FIG. 2, the head pipe 11 is provided between the pair of front forks 16. The saddle riding type vehicle 1 further includes an upper bracket 22 and an under bracket 23. The upper bracket 22 is provided above the head pipe 11. The under bracket 23 is provided under the head pipe 11. More specifically, the head pipe 11 is provided between the upper bracket 22 and the under bracket 23.

The saddle riding type vehicle 1 further includes a steering shaft 24. The steering shaft 24 preferably has a rod shape. An annular-shaped bearing 28 is provided between the steering shaft 24 and the head pipe 11. The steering shaft 24 is provided rotatably through the bearing 28 in the head pipe 11.

The upper bracket 22 includes a beam member. The left and right ends of the upper bracket 22 include a pair of through holes. The upper bracket 22 further includes a through hole in the center. The under bracket 23 is a beam member. The left and right ends of the under bracket 23 include a pair of through holes.

The pair of front forks 16 and the steering shaft 24 are fixed to the upper bracket 22 and the under bracket 23. The pair of front forks 16 is inserted to the through holes located at the ends of the upper bracket 22 and the ends of the under bracket 23 and attached to the upper bracket 22 and the under bracket 23. The steering shaft 24 is inserted in the through hole located in the center of the upper bracket 22 and attached to the upper bracket 22. The handle 12 is attached at the upper surface of the upper bracket 22 through a pair of attachment members 25.

In short, the steering shaft 24 and the pair of front forks 16 are attached to the handle 12. When the handle 12 is turned to the left and right, the steering shaft 24 and the pair of front forks 16 turn to the left and right together with the handle 12, so that the front wheel 17 turns to the left and right.

The saddle riding type vehicle further includes a detector 26. The detector 26 detects a steering angle. More specifically, the detector 26 preferably is a steering angle sensor, for example. Here, the "steering angle" refers to the rotation angle of the steering shaft 24 with respect to the forward direction of the saddle riding type vehicle 1. The detector 26 has a well-known structure. The detector 26 preferably is, for example, a potentiometer or an optical rotary encoder.

Referring to FIG. 2, the saddle type riding vehicle 1 further includes a steering damper device 100. The steering damper device 100 includes a steering damper 30 and a control device 40. Referring to FIG. 1, the control device 40 is preferably provided between the fuel tank 27 and the head pipe 11, for example. Note however that the location of the control device 40 is not limited to the above.

Figure 3:
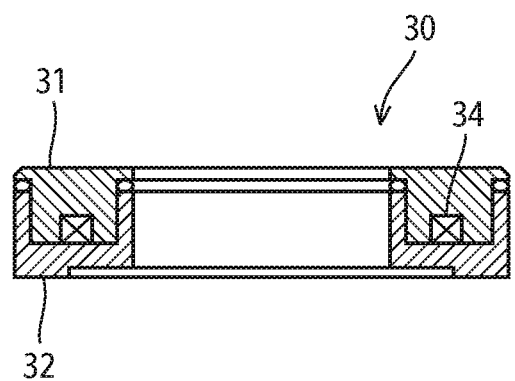
FIG. 3 is a sectional view of a steering damper.

Referring to FIG. 2, the steering damper 30 is provided between the head pipe 11 and the upper bracket 22. FIG. 3 is a sectional view of the steering damper 30. Referring to FIG. 3, the steering damper 30 is annular-shaped and provided coaxially with the head pipe 11. The steering shaft 24 is provided in the steering damper 30.

Figure 4:
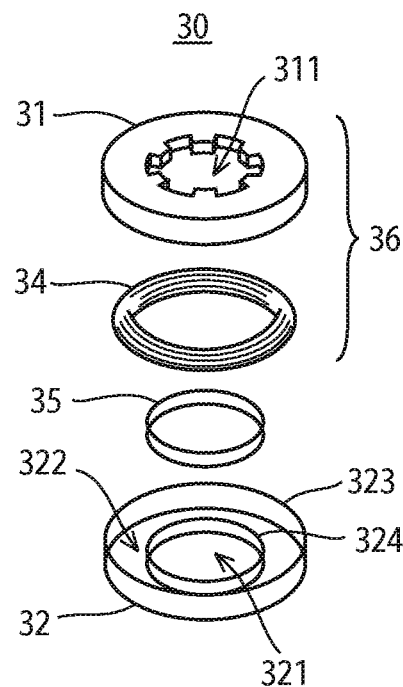
FIG. 4 is an exploded perspective view of the steering damper.

FIG. 4 is an exploded perspective view of the steering damper 30. Referring to FIG. 4, the steering damper 30 includes an electromagnet 36 and a magnetic member 32. The electromagnet 36 and the magnetic member 32 preferably are both annular shaped and provided coaxially with each other. The electromagnet 36 includes an annular yoke 31 and an annular coil 34. The coil 34 is provided under and coaxially with the yoke 31. The coil 34 is supplied with current from the control device 40.

The yoke 31 and the magnetic member 32 include a well-known ferromagnetic substance. The ferromagnetic substance may be a metal such as iron, nickel, and manganese. The ferromagnetic substance may be an alloy containing iron, nickel, and manganese. An example of the alloy is manganese zinc ferrite.

The magnetic member 32 includes a bottom plate 322, an outer circumferential wall 323, and an inner circumferential wall 324. The bottom plate 322 is a disk having a through hole 321 in the center. The inner circumferential wall 324 is provided at the inner circumference of the bottom plate 322 and the outer circumferential wall 323 is provided at the outer circumference of the bottom plate 322. The steering damper 30 further includes an annular color 35.

Figure 5:
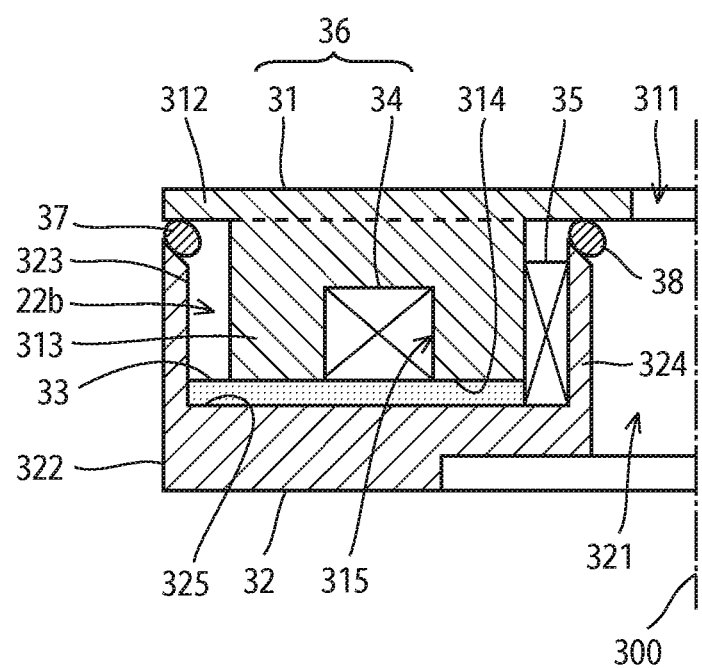
FIG. 5 is a partially sectional view of the steering damper shown in FIG. 3.

FIG. 5 is a partly sectional view of the steering damper 30 shown in FIG. 3. The axial line 300 in FIG. 5 is a central axis of the through hole of the steering damper 30. Therefore, FIG. 5 shows the left half of the sectional shape of the steering damper 30 in FIG. 3.

Referring to FIG. 5, the yoke 31 includes a top portion 312 and an annular portion 313. The top portion 312 has a disk shape having a through hole 311 in the center. The annular portion 313 is provided under and coaxially with the top portion 312. An annular groove 315 is provided at a lower surface 314 of the annular portion 312. The coil 34 is stored in the groove 315.

The magnetic member 32 includes a bottom surface 325 opposed to the lower surface 314 of the electromagnet 36. The annular portion 313 of the yoke 31 is stored between the outer circumferential wall 323 and the inner circumferential wall 324. There is a gap formed between the lower surface 314 and the bottom surface 325.

The steering damper 30 further includes a magnetic fluid 33. The magnetic fluid 33 is stored in the gap formed between the lower surface 314 and the bottom surface 325. The magnetic fluid 33 is a well-known magnetic fluid. Examples of the magnetic fluid 33 include a magneto-rheological fluid and a magnetic compound fluid.

An annular seal member 38 is provided between the inner circumferential wall 324 and the top portion 312. An annular seal member 37 is provided between the outer circumferential wall 323 and the top portion 312. The seal member 38 and 37 are preferably made of an elastic substance, an example of which is a well-known oil seal. The seal members 38 and 37 seal the gap between the lower surface 314 and the bottom surface 325.

The collar 35 is provided between the inner circumferential wall 324 and the annular portion 313. The yoke 31 is rotatably supported by the magnetic member 32 through the collar 35. The magnetic member 32 is attached to the head pipe 11 and the electromagnet 36 is attached to the steering shaft 24. Therefore, the electromagnet 36 is rotated relatively to the magnetic member 32.

The steering damper 30 damps the rotation force of the steering shaft 24 (i.e., the steering pull of the handle 12) in response to a magnetic field produced by the electromagnet 36. Now, the operation of the steering damper 30 will be described in detail.

When the electromagnet 36 does not produce a magnetic field, in other words, when the control device 40 supplies no current to the electromagnet 36, the viscosity of the magnetic fluid 33 is low. Therefore, the damping force of the steering damper 30 is very small. In this case, in response to the rider's operation of the handle 12, the steering shaft 24 is easily turned. During normal traveling, the control device 40 stops supplying current to the electromagnet 36. This makes it easier for the steering shaft 24 to turn, so that the rider can easily steer.

On the other hand, when the steering angle of the steering shaft 24 abruptly and greatly changes because of a disturbance, for example, the control device 40 supplies the electromagnet 36 with current. The disturbance here refers to rotation force or the like transmitted to the steering shaft 24 from the front wheel 17, for example, by a bumpy road surface. At the time, the electromagnet 36 supplied with the current produces a magnetic field. Therefore, the magnetic field is applied on the gap between the lower surface 314 and the bottom surface 325. The magnetic field increases the viscosity of the magnetic fluid 33 in the gap. As a result, a damping effect is obtained, so that shear force is generated between the electromagnet 36 and the magnetic member 32. The shear force acts in a direction opposite to the rotation direction of the electromagnet 36.

As described above, the magnetic member 32 is attached to the head pipe 11 and the electromagnet 36 is attached to the steering shaft 24. Therefore, the shear force damps the rotation of the steering shaft 24.

The viscosity of the magnetic fluid 33 changes, for example, as quickly as in milliseconds in response to the change in the magnetic field. Therefore, the damping force of the steering damper 30 changes quickly.

As described above, the steering damper 30 can change its damping force depending on whether or not a magnetic field is applied. The control device 40 supplies the coil 34 of the electromagnet 36 with current and adjusts the damping force of the steering damper 30.

The control device 40 controls current to be supplied to the electromagnet 36 in response to a steering angle and a steering angular velocity.

Figure 6:
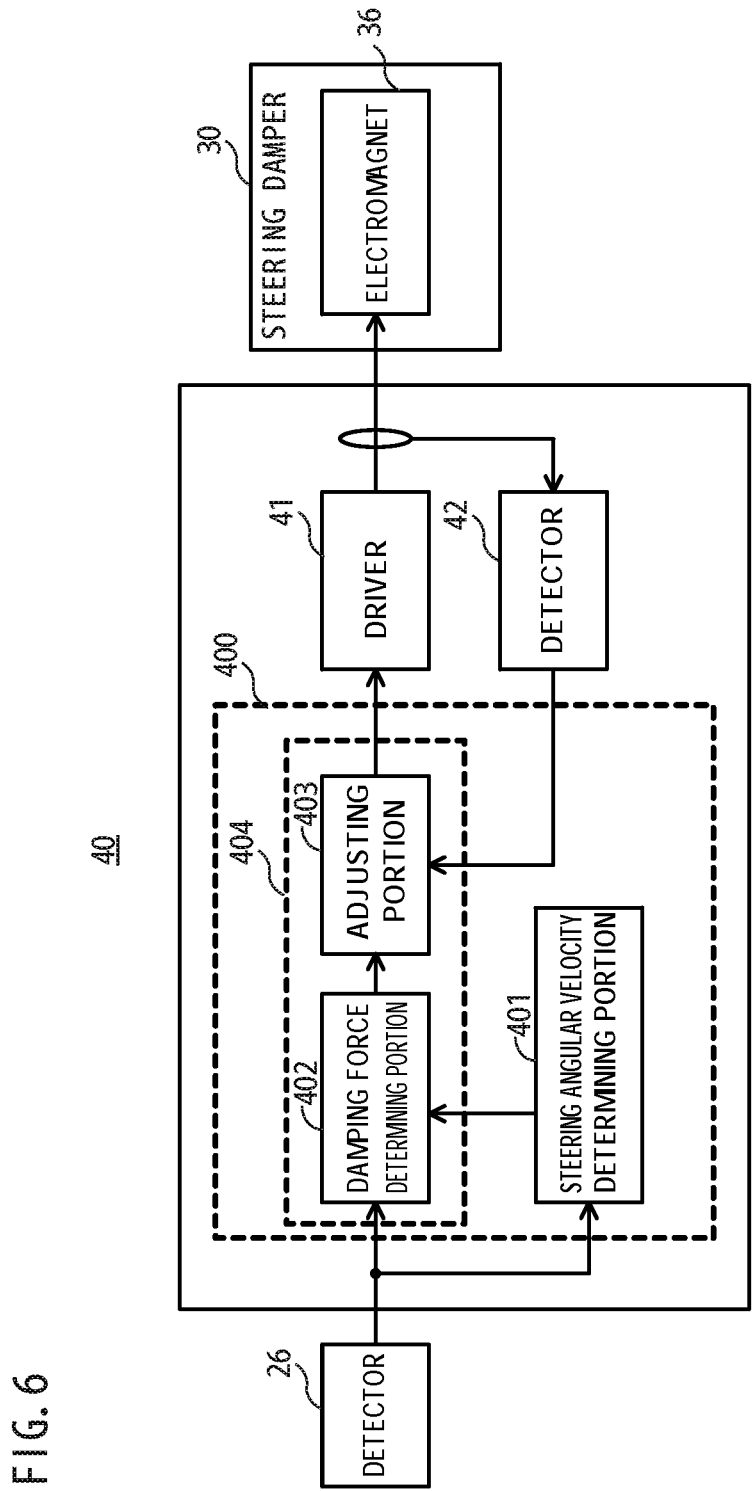
FIG. 6 is a functional block diagram of a controller.

FIG. 6 is a functional block diagram of the control device 40. The control device 40 includes a controller 400, a driver 41, and a detector 42.

The controller 400 determines a damping force to be exerted by the steering damper 30 based on a steering angle and a steering angular velocity of the steering shaft 24. The controller 400 further determines a current value based on the determined damping force. The controller 400 further instructs the driver 41 to supply current with the determined current value.

The driver 41 outputs current to the electromagnet 36 in magnitude corresponding to an instruction from the controller 400. The detector 42 detects the current value output by the driver 41 and notifies the controller 400 of the detection result. The controller 400 adjusts a current value to be informed to the driver 41 in an instruction based on the determined current value and the detection result of the detector 42.

The controller 400 includes, for example, a microcomputer. The controller 400 includes a steering angular velocity determining portion 401 and an instructing portion 404. The instructing portion 404 includes a damping force determining portion 402, and an adjusting portion 403.

Figure 7:
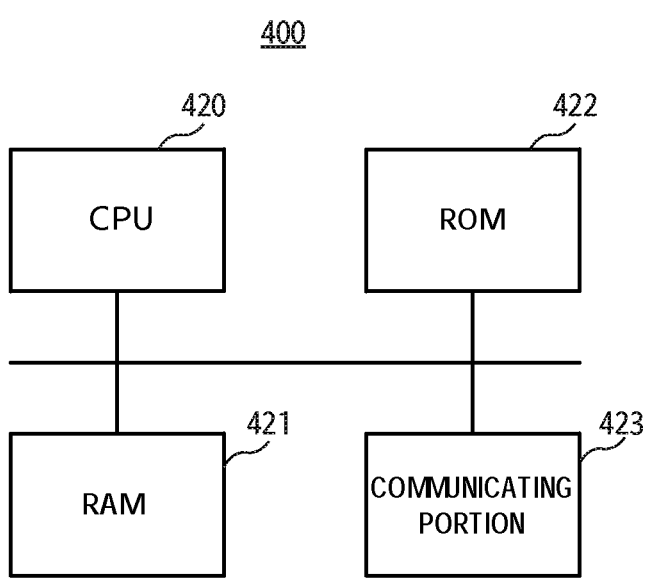
FIG. 7 is a block diagram of the hardware structure of a controller.

FIG. 7 is a block diagram of the hardware structure of the controller 400. Referring to FIG. 7, the controller 400 includes a CPU (Central Processing Unit) 420, a RAM (Random Access Memory) 421, a ROM (Read Only Memory) 422 and a communicating portion 423. The ROM 422 stores a control program. The communicating portion 423 receives a signal from the detectors 26 and 42 to output an instruction to the driver 41. When the control program is loaded in the RAM 421 and executed by the CPU 420, the steering angular velocity determining portion 401 and the instructing portion 404 (the damping force determining portion 402 and the adjusting portion 403) are implemented. Note that the controller 400 may include a hard disk drive. The control program may be stored in the hard disk drive, for example.

The steering angular velocity determining portion 401 determines a steering angular velocity based on a steering angle detected by the detector 26. The detector 26 outputs a steering angle signal having a voltage level according to the rotation of the steering shaft 24. The steering angular velocity determining portion 401 receives the steering angle signal. The steering angular velocity determining portion 401 samples a voltage level of the steering signal in reference cycles. The steering angular velocity determining portion 401 obtains the steering angle based on the voltage level. In this example, the reference cycle is reference time $\Delta TS$. More specifically, the steering angular velocity determining portion 401 samples a steering angle signal and obtains a steering angle for every reference time $\Delta TS$.

The steering angle determining portion 401 determines a steering angular velocity based on a plurality of steering angles obtained by sampling. More specifically, the steering angle determining portion 401 obtains a differential value between a steering angle obtained at time T and a steering angle obtained at time T+ΔTS. The obtained differential value is divided by the reference time ΔTS to determine a steering angular velocity. In this example, when the determined steering angular velocity is positive (+), it indicates that the steering shaft 24 (or handle 12) is turned to the right. When the steering angular velocity is negative (−), it indicates that the steering shaft 24 is turned to the left.

The instructing portion 404 instructs the driver 41 to supply current or stop supplying current to the electromagnet 36 in the steering damper 30 based on a steering angle and a steering angular velocity.

The instructing portion 404 includes the damping force determining portion 402 and the adjusting portion 403. The damping force determining portion 402 receives a steering angle signal from the detector 26. The damping force determining portion 402 further obtains a steering angular velocity determined by the steering angular velocity determining portion 401. The damping force determining portion 402 determines a damping force for the steering damper 30 based on the steering angle signal and the steering angular velocity.

The adjusting portion 403 instructs the driver 41 to supply the electromagnet 36 with current in magnitude corresponding to the determined damping force. More specifically, the adjusting portion 403 determines a current value to be supplied to the steering damper 30 based on the determined damping force. Hereinafter, the determined current value will be referred to as "target current value." The adjusting portion 403 further receives a detection signal indicating a current value being output by the driver 41 to the steering damper 30 from the detector 42. Hereinafter, the current value indicated by the detection signal will be referred to as "actual current value." The adjusting portion 403 instructs the driver 41 to adjust current so that an actual current value is equal to a target current value. More specifically, the adjusting portion 403 outputs a PWM signal having a duty ratio corresponding to the difference between the actual current value and the target current value to the driver 41. The driver 41 supplies the electromagnet 36 with current in response to the PWM signal.

The control device 40 controls the damping force of the steering damper 30 in response to a steering angular velocity. More specifically, the control device 40 supplies the electromagnet 36 in the steering damper 30 with current when the steering angular velocity exceeds a reference velocity Vref1. As described above, when the electromagnet 36 is supplied with current, braking force is exerted.

If the braking force is exerted as long as the steering angular velocity exceeds the reference velocity Vref1, it is all the more difficult for the rider to operate the handle 12. In short, the steering feeling of the handle 12 is degraded.

Therefore, the control device 40 supplies the steering damper 30 with current until reference time ΔT0 elapses after the steering angular velocity exceeds the reference velocity Vref1 and stops supplying current after the reference time ΔT0 elapses. In this case, braking force is exerted in an early stage of steering pull of the handle 12 caused by a disturbance or the like. However, after the reference time ΔT0, braking force is not exerted. Therefore, during the early stage in which the handle 12 is abruptly pulled by a disturbance (until the reference time ΔT0 elapses after the steering angular velocity exceeds Vref1), the steering pull of the handle 12 is restrained and after the early stage (after the reference time ΔT0 elapses), the steering feeling is improved.

The control device 40 further controls the steering damper 30 so that damping force corresponding to a steering angular velocity is exerted. Therefore, braking force corresponding to the steering pull of the handle 12 is exerted.

The reference velocity Vref1 is preferably greater than a steering angular velocity when the rider steers the handle 12. In this way, braking force is unlikely to work because of the steering by the rider.

Furthermore, when the saddle riding vehicle 1 is an off-road vehicle such as a motocrosser, the rider sometimes steers the handle 12 greatly in order to keep the vehicle's balance in the air during jumping. If braking force is exerted in such a case, it is difficult for the rider to steer the handle 12. Therefore, it is preferable that braking force is not exerted in such a case.

The control device 40 therefore stops supplying current to the steering damper 30 while the steering angle exceeds a reference steering angle RAref. In this way, while the handle 12 exceeds the reference steering angle RAref, braking force is not exerted. Therefore, the rider can steer the handle 12 easily.

Figure 8:
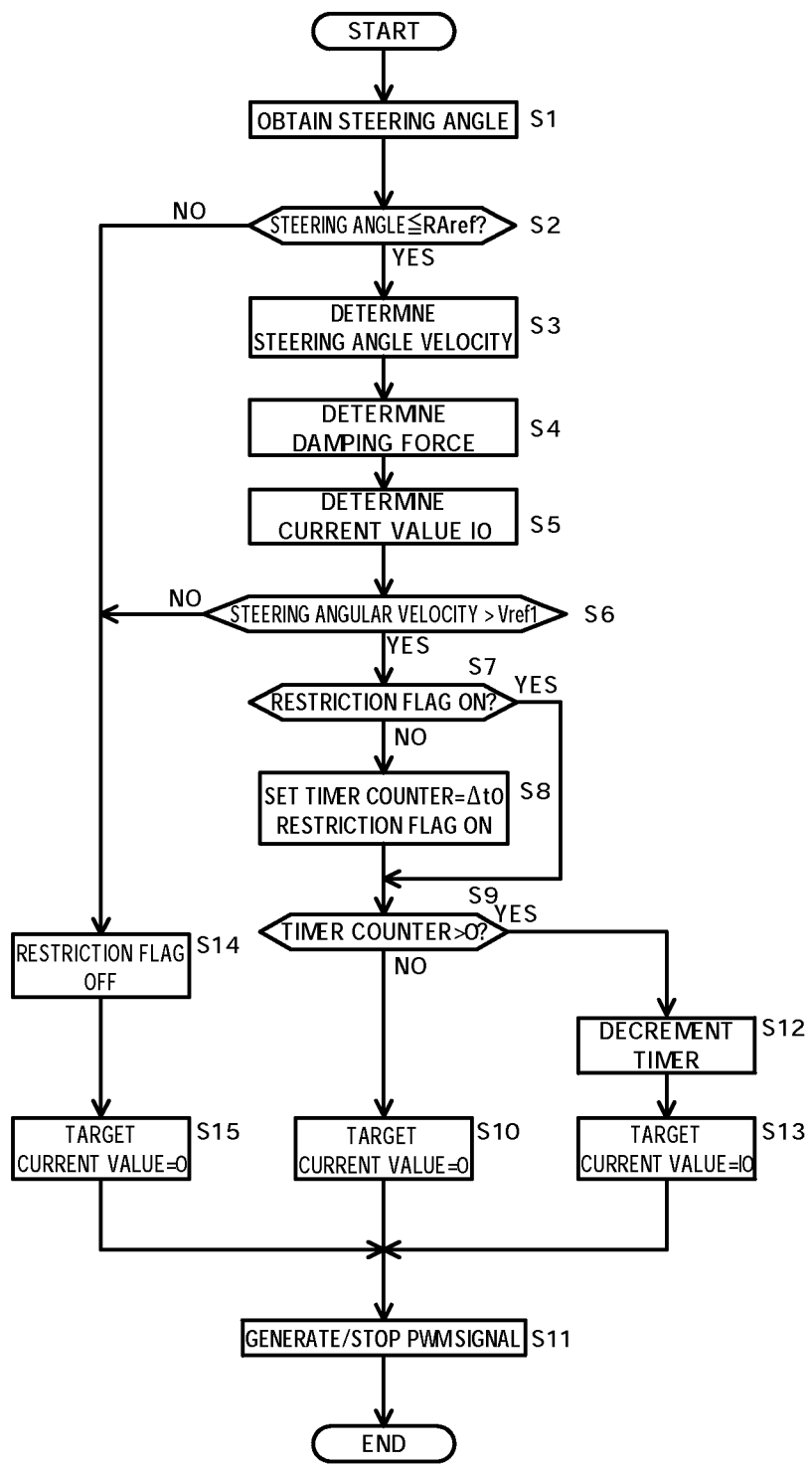
FIG. 8 is a flowchart for use in illustrating the operation of the controller.
Figure 9:
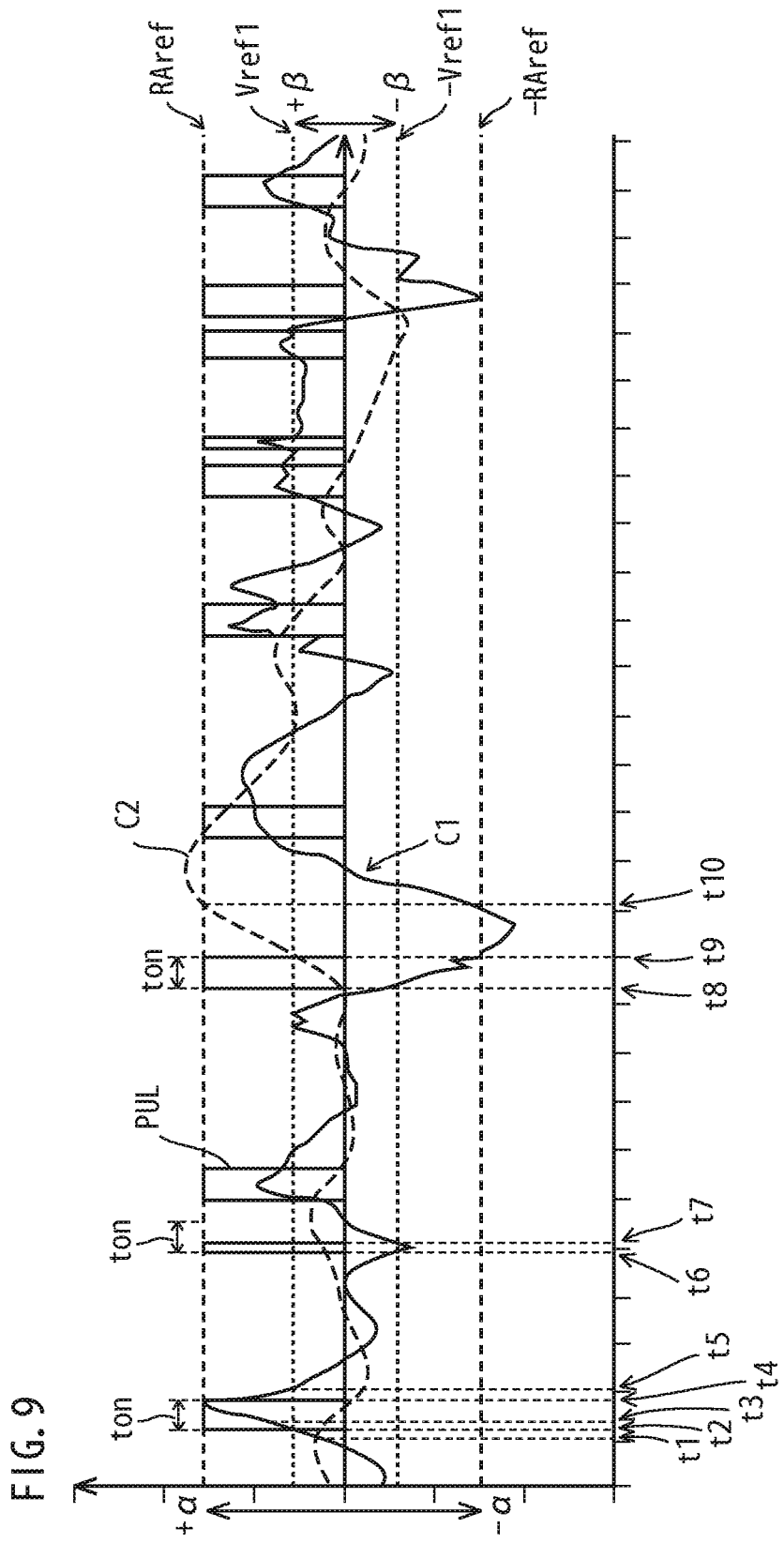
FIG. 9 is a chart showing a relationship among a steering angle, a steering angular velocity, and timing for the controller to instruct current supply in a saddle riding type vehicle.

The operation of the above-described control device 40 will be described detail. FIG. 8 is a flowchart for use in illustrating the operation of the controller 400. Hereinafter, the operation shown in FIG. 8 will be referred to as "control processing." FIG. 9 is a chart showing a relationship among a steering angle, a steering angular velocity, and timing for the control device 40 to supply the steering damper 30 with current in the saddle riding type vehicle 1. The solid line C1 in FIG. 9 is an example of transition of a steering angular velocity in the saddle riding type vehicle 1. The broken line C2 indicates an example of transition of a steering angle. The waveform PUL indicates the presence/absence of an instruction to supply current by the instructing portion 404. At a high level (H level) position in the waveform PUL, the instructing portion 404 instructs the driver 41 to supply current. At a low level (L level) position in the waveform PUL, the instructing portion 404 instructs the driver 41 to stop supplying current.

The controller 400 carries out control processing for every reference time that is shorter than the reference time ΔT0. In this example, the controller 400 carries out control processing every reference time ΔTS while sampling is carried out by the steering angular velocity determining portion 401. In short, the reference time in which the control processing is carried out is equal to the sampling cycle (reference time ΔTS) at the steering angular velocity determining portion 401. However, the reference time in which the control processing is carried out may be different from the sampling cycle. For example, the reference time in which the control processing is carried out may be longer than the sampling cycle.

Referring to FIG. 8, when the reference time ΔTS elapses, the steering angular velocity determining portion 401 in the controller 400 obtains a steering angle (S1). The steering angular velocity determining portion 401 samples a steering angle signal output from the detector 26 to obtain a steering angle.

Then, the instructing portion 404 in the controller 400 determines whether the steering angle is within the reference steering angle RAref (S2). As shown in FIG. 9, in this example, the reference steering angle RAref is defined as ±α°. The instructing portion 404 determines whether the steering angle obtained in step S1 is within the range of ±α°.

When, for example, the control processing in FIG. 8 is carried out at time t10 in FIG. 9, the instructing portion 404 determines that the steering angle (broken line C2) exceeds the reference steering angle RAref (=α°) (NO in S2). In this case, the instructing portion 404 sets a target current value to zero (S15). More specifically, the instructing portion 404 instructs the driver 41 to stop supplying current. In this case, the adjusting portion 403 does not generate a PWM signal (S11). Therefore, the driver 41 does not supply current to the electromagnet 36.

On the other hand, when the steering angle is within the range of RAref=±α° as it is at time t1 in FIG. 9 (YES in S2), the controller 400 determines a damping force corresponding to the steering angular velocity and hence a current value I0 to be supplied to the electromagnet 36 based on the determined damping force (S3 to S5).

To start with, the steering angular velocity determining portion 401 determines a steering angular velocity (S3). As described above, the steering angular velocity determining portion 401 determines a steering angular velocity depending on a steering angle value obtained for each reference time ΔTS by sampling (S3). In step S3, the steering angular velocity determining portion 401 calculates the difference between the steering angle obtained by control processing at time t1 and the steering angle obtained by control processing at time t1−ΔTS. The obtained difference is divided by the reference time ΔTS to produce a steering angular velocity (°/s).

Figures 10, 11:
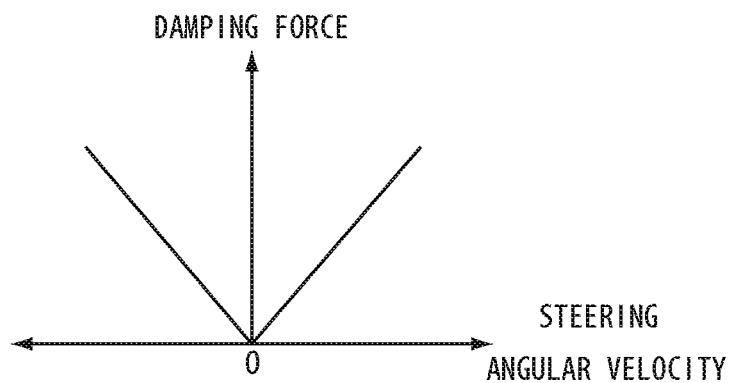
FIG. 10 is a graph showing a relationship between a steering angular velocity and a damping force value in a damping force determining table.
FIG. 11 is a table showing the data structure of a current determining table.

The instructing portion 404 determines a damping force to be exerted by the steering damper 30 based on the steering angular velocity determined in step S3 (S4). A damping force determining table is stored in the ROM 422 or RAM 421 in the controller 400. A plurality of steering angular velocities and a plurality of damping force values corresponding to the plurality of steering angular velocities are registered in the damping force determining table. FIG. 10 is a graph showing a relationship between steering angular velocities and damping force values in the damping force determining table. Referring to FIG. 10, as the steering angular velocity increases either in the positive or negative direction, the damping force value increases. The relationship between the steering angular velocities and the damping force values is not limited to that shown in FIG. 10. Steering angular velocities and damping force values having a different relationship from that in FIG. 10 may be registered in the damping force determining table.

The damping force determining portion 402 in the instructing portion 404 refers to the damping force determining table to determine a damping force value corresponding to the steering angular velocity determined in step S3 (S4).

The instructing portion 404 further determines a current value I0 based on the damping force value determined in step S4 (S5). A current determining table is stored in the ROM 422 or RAM 421. As shown in FIG. 11, a plurality of damping force values and current values I0 corresponding to the plurality of damping force values are registered in the current determining table.

The adjusting portion 403 in the instructing portion 404 refers to the current determining table to search for a current value I0 corresponding to the damping force value determined in step S4. The adjusting portion 403 determines a current value obtained as the result of searching as the current value I0.

After the current value I0 is determined, the instructing portion 404 determines whether or not to supply current to the steering damper 30 (S6 to S15). Stated differently, the instructing portion 404 determines whether or not to enable braking force.

To start with, the instructing portion 404 determines whether the steering angular velocity determined in step S3 exceeds the reference velocity Vref1 (S6). The damping force determining portion 402 in the instructing portion 404 may carry out the determination in step S6 or the adjusting portion 403 may carry out the determination in step S6. In the following description, if either the damping force determining portion 402 or the adjusting portion 403 carries out the operation, the operation will also be referred to as being carried out simply by the "instructing portion 404." The reference velocity Vref1 is stored in the ROM 422 or RAM 421.

For example, if the steering angular velocity obtained in step S3 is a positive value, the instructing portion 404 determines whether the steering angular velocity is greater than the reference velocity Vref1=+β (°/s). If the steering angular velocity obtained in step S3 is a negative value, the instructing portion 404 determines whether the steering angular velocity is greater than the reference velocity Vref1=−β (°/s). In short, the instructing portion 404 determines whether the absolute value of the steering angular velocity obtained in step S3 is greater than the reference velocity Vref1=β.

If the result of determination in step S6 indicates that the steering angular velocity (solid line C1) is smaller than the reference velocity Vref1 as it is at time t1 in FIG. 9 (NO in S6), braking force is not necessary. The instructing portion 404 therefore instructs the driver 41 to stop supplying current (S15). More specifically, the adjusting portion 403 sets the target current value to "0." The target current value is "0" and therefore the adjusting portion 403 does not generate a PWM signal (S11). In this way, the driver 41 does not supply the electromagnet 36 with current.

On the other hand, if the result of determination in step S6 indicates that the steering angular velocity is greater than the reference velocity Vref1 as it is at time t2 in FIG. 9 (YES in S6), braking force should be exerted because the handle 12 has abruptly been pulled. Therefore, the instructing portion 404 instructs the driver 41 to supply current.

In this case, the instructing portion 404 determines whether a restriction flag is on to start with (S7). The restriction flag is used by the instructing portion 404 to determine whether or not to restrict supplying current. The restriction flag is stored in the RAM 421. When no current is supplied, the restriction flag is "off." Therefore, at time t2, the restriction flag is "off" (NO in S7).

The instructing portion 404 then prepares to supply current (S8). More specifically, the instructing portion 404 sets a timer counter to the reference time ΔT0=ton. Here, the reference time ΔT0 is longer than an operation cycle (reference time ΔTS here) for control processing. The instructing portion 404 further turns "on" the restriction flag. The timer counter and the restriction flag are stored in the RAM 421.

The instructing portion 404 then determines whether the timer count is greater than zero (S9). At time t2, the timer count has barely been set and therefore the timer counter is greater than zero (YES in S9). The instructing portion 404 then decrements the timer counter (S12) and the adjusting portion 403 sets the target current value to a current value I0 determined in step S5 (S13).

The adjusting portion 403 further outputs a PWM signal used to control the driver 41 based on the target current value determined in step S13 (S11). The detector 42 in the control device 40 outputs a detection signal indicating a current value (i.e., actual current value) being output by the driver 41 to the steering damper 30. The adjusting portion 403 receives a detection signal from the detector 42 and obtains an actual current value based on the detection signal. The adjusting portion 403 instructs the driver 41 to adjust current so that the actual current value is equal to the target current value. More specifically, the adjusting portion 403 outputs a PWM signal having a duty ratio corresponding to the difference between the actual current value and the target current value (S11).

The driver 41 receives the PWM signal and supplies the electromagnet 36 with current equal to the target current in magnitude. Therefore, the steering damper 30 exerts a damping force corresponding to a damping force value determined in step S4.

Then, at time t3, the controller 400 again carries out control processing (FIG. 8). The instructing portion 404 determines a current value I0 corresponding to a steering angular velocity at time t3 (S5). The instructing portion 404 then determines that the steering angular velocity has exceeded the reference velocity Vref1=β (YES in S6).

At time t2, the restriction flag is switched from "off" to "on." Therefore, at time t3, the restriction flag remains to be "on." The instructing portion 404 then determines in step S7 that the restriction flag is on (YES in S7) and proceeds to step S9. In step S9, the timer counter does not indicate zero (YES in step S9), and therefore the instructing portion 404 decrements the timer counter (S12) and sets the current value I0 determined in step S5 as a target current value (S13).

The reference time ΔT0=ton elapses from time t1 and at time t4, the controller 400 again carries out control processing (FIG. 8). At the time, the instructing portion 404 determines a current value I0 corresponding to the steering angular velocity in step S5 and determines that the steering angular velocity exceeds the reference velocity Vref1 (YES in S6). The instructing portion 404 further determines whether the timer counter indicates zero (S9). Reference time ΔT0=ton elapses from time t2 and time t4 is reached. Therefore, at time t4, the timer counter indicates zero. The instructing portion 404 then determines that the timer counter indicates zero (NO in S9). In this case, the adjusting portion 403 sets the target current value to "0" (S10). In this case, the adjusting portion 403 does not output a PWM signal (S11). Therefore, the driver 41 stops supplying current. Note that at the time, the restriction flag remains to be "on."

As in the foregoing, the driver 400 instructs the driver 41 to supply current when the steering angular velocity exceeds the reference velocity Vref1. When the reference time ΔT0 elapses after the steering angular velocity exceeds the reference velocity Vref1, the instructing portion 404 instructs the driver 41 to stop supplying current.

In short, because of the control processing, the braking force of the steering damper 30 works during the reference time ΔT0 and does not work after the reference time elapses. In this way, the steering pull of the handle caused by a disturbance is reduced and degradation in the steering feeling can be reduced.

The reference time ΔTS elapses after time t4 and at time t5, the controller 400 again carries out control processing (FIG. 8). At the time, as shown in FIG. 9, the steering angular velocity is greater than the reference velocity Vref1 (YES in S6). Therefore, the instructing portion 404 carries out the operation in step S7. Here, the restriction flag remains to be "on" (YES in S7). Therefore, the instructing portion 404 carries out the operation in step S9. The timer counter indicates "0" and therefore the adjusting portion 403 sets the target current value to "0" (S10).

More specifically, when the reference time ΔT0 elapses after the steering angular velocity exceeds the reference velocity Vref1, the instructing portion 404 does not instruct current supply if the steering angular velocity is still greater than the reference velocity Vref1. In this way, as long as the steering angular velocity is greater than the reference velocity Vref1, braking force can be prevented from working, which improves the steering feeling.

When the steering angular velocity is less than the reference velocity Vref1 before reference time ΔT0 elapses, the controller 400 stops supplying current before the reference time ΔT0 elapses. In this way, braking force is not exerted. Even before the reference time ΔT0 elapses, when the steering angular velocity drops, braking force is quickly stopped. This improves the steering feeling.

At time t6 in FIG. 9, the steering angular velocity exceeds Vref1 (=−β) (YES in S6). Therefore, at time t6, the instructing portion 404 sets the timer counter to the reference time ΔT0=ton and turns on the restriction flag (YES in S7, S8). The adjusting portion 403 in the instructing portion 404 sets the current value I0 determined in step S5 as a target current value (S13). In this way, the adjusting portion 403 outputs a PWM signal and the driver 41 supplies the electromagnet 36 with current (S11).

In FIG. 9, at time t7 before the reference time ΔT0 (=ton) elapses from time t6, the steering angular velocity is less than the reference velocity Vref1. In control processing at time t7, the instructing portion 404 determines that the steering angular velocity is less than the reference velocity Vre1 (NO in S6). Therefore, the instructing portion 404 turns "off" the restriction flag (S14) and sets the target value to "0" (S15). Through the above-described operation, the output of the PWM signal is stopped and the driver 41 stops supplying current (S11). Therefore, braking force is not exerted.

When the steering angle exceeds the reference steering angle RAref, it is highly likely that the rider steers the handle 12. Therefore, the controller 400 carries out such control that braking force is not exerted. In this way, degradation in the steering feeling can be reduced.

At time t8 in FIG. 9, the instructing portion 404 instructs the driver 41 to supply current (S13) and stop supplying current at time t9 after the reference time ΔT0 elapses (S10). At time t9, the restriction flag is still "on."

At time t10, the steering angular velocity is still higher than the reference velocity Vref1. The steering angle exceeds the reference steering angle RAref=+α. At the time, the instructing portion 404 determines in step S2 that the steering angle exceeds the reference steering angle RAref (NO in S2). Therefore, the instructing portion 404 turns "off" the restriction flag in the RAM 421 (S14) and sets the target current value to "0" (S15).

Through the-above described operation, the controller 400 instructs the driver 41 to supply current until the reference time ΔT0 elapses after the steering angular velocity exceeds the reference velocity Vref1. When the steering angular velocity once exceeds the reference velocity Vref1 and then becomes less than the reference velocity Vref1 before reference time ΔT0 elapses, the controller 400 instructs the driver 41 to stop supplying current. When the steering angle exceeds the reference steering angle RAref, the controller 400 instructs the driver 41 to stop supplying current. Through the above-described operation by the controller 400, abrupt steering pull of the handle 12 caused by a disturbance is restrained. On the other hand, braking force is exerted at the beginning of the steering pull of the handle 12 caused by a disturbance but it stops working after the reference time ΔT0 elapses. If the steering angular velocity becomes small before the reference time ΔT0 elapses, braking force is stopped. Therefore, at least after the reference time ΔT0, it can be easier for the rider to steer the handle 12. When the rider steers the handle 12 intentionally such as in an occasion of jumping, braking force is not exerted, which makes it easy for the rider to steer the handle.

In the control processing in FIG. 8, it is determined in step S2 whether the steering angle exceeds the reference steering angle RAref. However, step S2 may be omitted from a preferred embodiment of the present invention. More specifically, the controller 400 may control the braking force depending only on the steering angular velocity without controlling it based on the steering angle.

In FIG. 8, a damping force corresponding to a steering angular velocity is determined in step S4 and a current value I0 corresponding to the damping force determined in step 5 is determined. However, in the present preferred embodiment, the current value I0 corresponding to the steering velocity may be determined directly. In this case, a plurality of steering angular velocities and current values I0 corresponding to the plurality of steering angular velocities are preferably registered in the current determining table stored in the RAM 421.

In FIG. 8, when the steering angular velocity once exceeds the reference velocity Vref1 and then becomes less than the reference velocity Vref1 before the reference time ΔT0 elapses, braking force is stopped. However, in the present preferred embodiment, braking force may continue to be exerted in the reference time ΔT0 once the steering angular velocity exceeds Vref1 regardless of how the steering angular velocity changes afterwards. Also in this case, the steering pull of the handle caused by a disturbance is reduced. Furthermore, braking force is stopped once the reference time ΔT0 elapses and therefore degradation in the steering feeling can be reduced.

The steering damper 30 is not limited to the shape shown in FIG. 3. The steering damper 30 needs only include an electromagnet provided around the steering shaft 24 and having a first surface, a magnetic member provided around the steering shaft 24 and having a second surface opposed to the first surface of the electromagnet, and a magnetic fluid stored in a gap formed between the first and second surfaces. For example, the electromagnet and the magnetic member may be both annular and the electromagnet may be stored in a through hole in the center of the magnetic member. In this case, the magnetic fluid is stored in a gap between the outer circumferential surface of the electromagnet and the inner circumferential surface of the magnetic member. The electromagnet and the magnetic member may be both annular and the magnetic member may be stored in a through hole in the center of the electromagnet. In this case, the magnetic fluid is stored in a gap formed between the inner circumferential surface of the electromagnet and the outer circumferential surface of the magnetic member. Note that the steering damper 30 may include an enclosing member used to enclose the above-described gap formed between the first and second surfaces.

In the foregoing description, the electromagnet 36 in the steering damper 30 is preferably attached to the steering shaft 24 and the magnetic member 32 is preferably attached to the head pipe 11. However, the electromagnet 36 may be attached to the head pipe 11 and the magnetic member 32 may be attached to the steering shaft 24. In short, it is only necessary that one of the electromagnet 36 and the magnetic member 32 is attached to the head pipe 11 and the other is attached to the steering shaft 24.

In the foregoing description, when reference time ΔT0 elapses after the steering angular velocity exceeds the reference velocity Vref1, preferably the controller 400 instructs the driver 41 to stop supplying current. However, when reference time ΔT0 elapses after the steering angular velocity exceeds the reference velocity Vref1, the controller 400 may reduce current supply instead of stopping it. More specifically, the controller 400 instructs the driver 41 to reduce current supply so that braking force by the steering damper 30 when reference time ΔT0 elapses after the steering angular velocity exceeds the reference velocity Vref1 is smaller than braking force by the steering damper 30 in the reference time ΔT0. In this case, after the reference ΔT0 elapses, braking force by the steering damper 30 is reduced. This improves the steering feeling.

The controller 400 may instruct the driver 41 to reduce current supply when the steering angular velocity once exceeds the reference velocity Vref1 and then becomes less than the reference velocity Vref1 before the reference time ΔT0 elapses. The controller 400 may instruct to reduce current supply when the steering angle exceeds the reference steering angle RAref.

Second Preferred Embodiment

Figure 12:
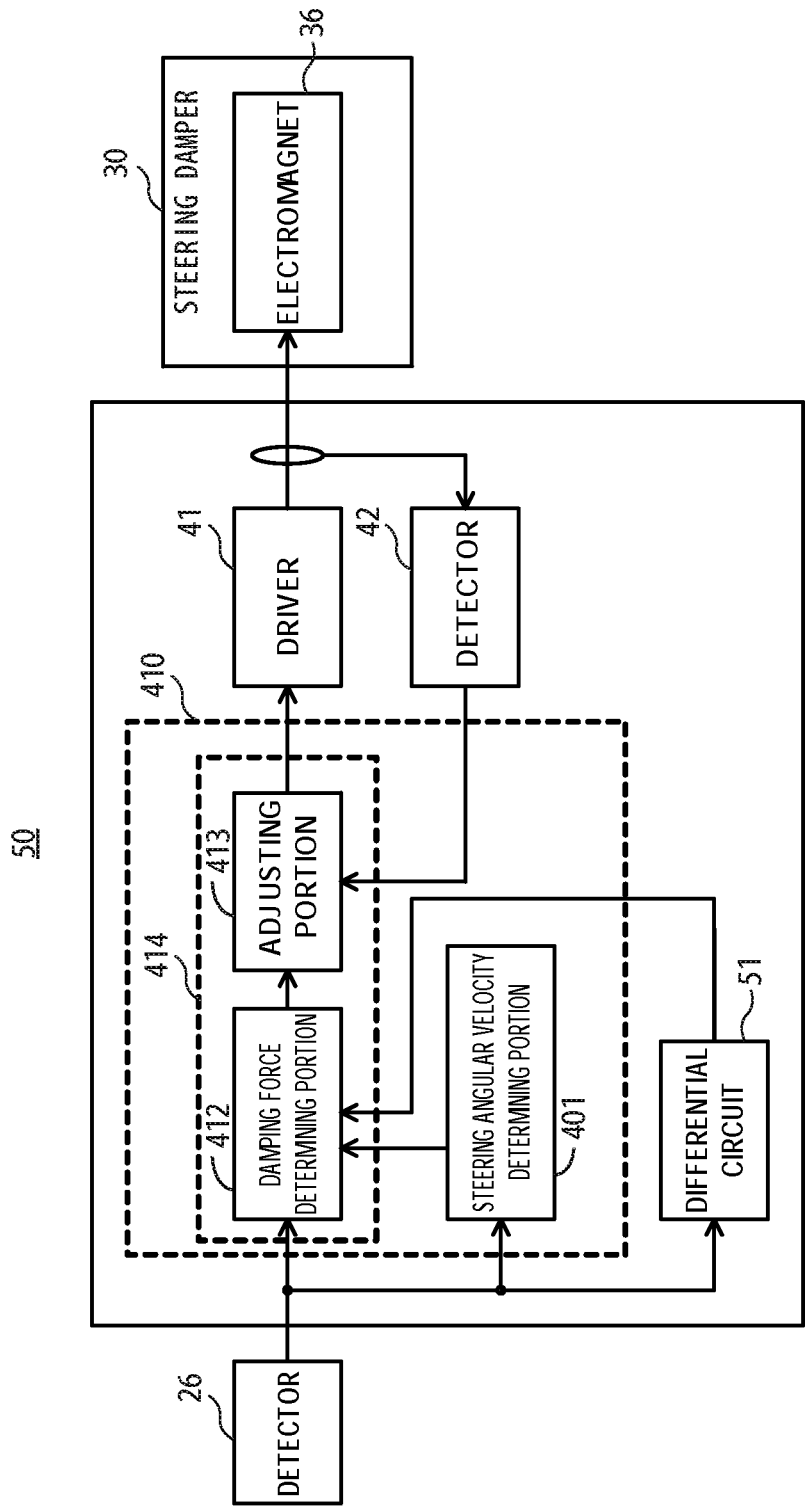
FIG. 12 is a functional block diagram of the structure of a control device 50 in a saddle riding type vehicle according to a second preferred embodiment of the present invention.

FIG. 12 is a functional block diagram of the structure of a control device 50 for use in a saddle riding type vehicle according to a second preferred embodiment of the present invention. The structure of the vehicle according to the second preferred embodiment other than the control device 50 is preferably the same or substantially the same as that of the saddle riding type vehicle 1 according to the first preferred embodiment.

Referring to FIG. 12, the control device 50 includes a controller 410, a driver 41, a detector 42, and a differential circuit 51.

The differential circuit 51 differentiates a steering angle signal output from the detector 26 and determines a steering angular velocity. More specifically, the differential circuit 51 differentiates the steering angle signal and outputs a steering angular velocity signal having a voltage level corresponding to the steering angular velocity. Hereinafter, the steering angular velocity determined by the differential circuit 51 will be referred to as "analog steering angular velocity."

Figure 13:
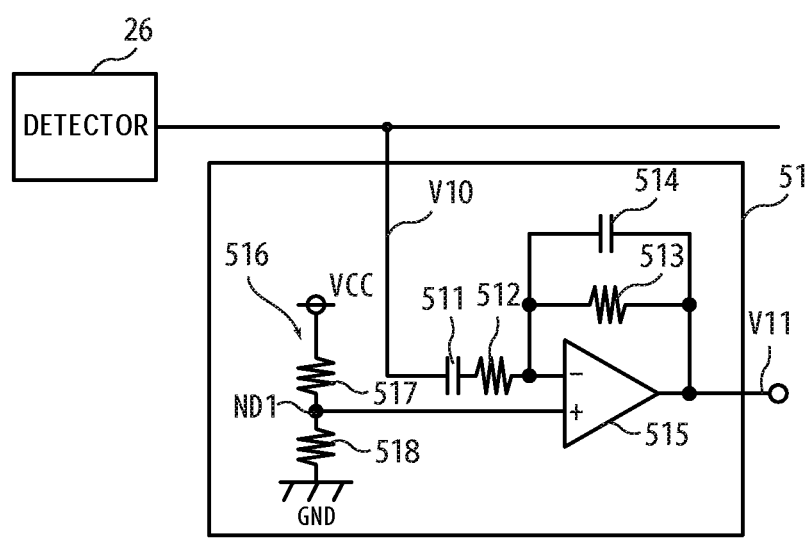
FIG. 13 is a circuit diagram of a differential circuit shown in FIG. 12.

FIG. 13 is a circuit diagram of the differential circuit 51. Referring to FIG. 13, the differential circuit 51 is a well-known differential circuit. The differential circuit 51 includes capacitors 511 and 514, resistors 512 and 513, and a voltage dividing circuit 516. The capacitor 511 is connected between the detector 26 and an inverting input terminal (−) of an operational amplifier 515. The resistor 512 is connected between the capacitor 511 and the inverting input terminal (−) of the operational amplifier 515. The resistor 513 and the capacitor 514 are both connected between the inverting input terminal (−) and the output terminal of the operational amplifier 515 and apply negative feedback at the operational amplifier 515.

The voltage divider circuit 516 includes resistors 517 and 518. The voltage dividing circuit 516 is connected in series between a power supply voltage VCC and a ground node GND. A voltage dividing node ND1 is provided between the resistors 517 and 518 and connected to a non-inverting input terminal (+) of the operational amplifier 515. At the voltage dividing node ND1, the power supply voltage VCC is divided in the ratio of resistors 517 and 518.

The differential circuit 51 differentiates a steering angle signal V10 from the detector 26 and outputs a change in a differential value as a steering angular velocity signal V11.

The differential circuit 51 includes the operational amplifier 515. Therefore, if the differential value change is small, the steering angular velocity signal V11 becomes large. Therefore, the differential amplifier 51 can detect a low steering angular velocity. The differential circuit 51 however has a delay caused by the differential processing. The time delay is determined based on the circuit configuration of the differential circuit 51.

The controller 410 includes a steering angular velocity determining portion 401 and an instructing portion 414. The instructing portion 414 includes a damping force determining portion 412 and an adjusting portion 413. The controller 410 includes, for example, a microcomputer. The hardware configuration of the controller 410 is as shown in FIG. 7. A control program stored in a ROM 422 is downloaded onto a RAM 421 and run by a CPU 420 to implement the steering angular velocity determining portion 401 and the instructing portion 414.

The steering angular velocity determining portion 401 samples a steering angle signal for every reference time ΔTS and determines a steering angular velocity based on a plurality of steering angles obtained by sampling similarly to the first preferred embodiment. Hereinafter, the steering angular velocity determined by the steering angular determining portion 401 will be referred to as "digital steering angular velocity."

The steering angular velocity determining portion 401 has no delay unlike the differential circuit 51. Therefore, when a target current value is set using a digital steering angular velocity, the response of the steering damper 30 becomes quicker. However, when the reference time ΔTS is small, in other words, when the sampling cycle is short, the accuracy of the produced steering angular velocity is reduced. When the steering angular velocity is small in particular, the accuracy of the digital steering angular velocity is lower than that of the analog steering angular velocity.

Therefore, in order to quicken the response of the steering damper 30, it is preferable to use a digital steering angular velocity. On the other hand, when a higher accuracy for the steering angular velocity is desired, an analog steering angular velocity is preferably used.

The instructing portion 414 separately uses the digital and analog steering angular velocities. More specifically, when the steering angular velocity is high, the steering damper 30 preferably has a quicker response. Therefore, in this case, the instructing portion 414 sets a target current based on a digital steering angular velocity. On the other hand, when the steering angular velocity is low, the accuracy of the digital steering angular velocity is preferably reduced. Therefore, in this case, the instructing portion 414 determines a target current value based on an analog steering angular velocity.

More specifically, the damping force determining portion 412 in the instructing portion 414 obtains a digital steering angular velocity for every reference time ΔTS. The damping force determining portion 412 determines whether the digital steering angular velocity exceeds a reference velocity Vref2. Here, the reference velocity Vref2 is higher than the reference velocity Vref1.

When the digital steering angular velocity exceeds the reference velocity Vref2, the steering angular velocity is high and therefore the steering damper 30 preferably responds quickly. Therefore, the adjusting portion 413 in the instructing portion 414 uses a digital steering angular velocity to set a target current value. On the other hand, when the digital steering angular velocity is not more than the reference velocity Vref2, the steering angular velocity is low. Therefore, the adjusting portion 413 uses an analog steering angular velocity with higher accuracy to set a target current value.

Through the above-described operation, the steering damper 30 can respond quickly to the steering pull of the handle 12, and when the steering angular velocity is small (to be specific, when it is lower than the reference velocity Vref2 and higher than the reference angular velocity Vref1), the steering damper 30 can accurately exert braking force corresponding to the steering angular velocity. Now, details of the operation of the control device 50 will be described.

FIG. 14 is a flowchart for use in illustrating control processing by the control device 50. Referring to FIG. 14, operation from steps S1 to S3 is the same as that in FIG. 8. The damping force determining portion 412 in the instructing portion 414 determines whether a digital steering angular velocity determined in step S3 is within the reference velocity Vref2 (S21). If the digital steering angular velocity exceeds the reference velocity Vref2 (NO in S21), the damping force determining portion 412 determines a damping force based on the digital steering angular velocity (S4). More specifically, the damping force determining portion 412 determines a damping force corresponding to the digital steering angular velocity in step S3 based on the damping force determining table stored in the RAM 421 similarly to step S4 in FIG. 8.

On the other hand, as a result of determining in step S21, if the digital steering angular velocity is less than the reference velocity Vref2 (YES in S1), the instructing portion 414 determines a damping force based on an analog steering angular velocity (S22 and S23). The damping force determining portion 412 obtains the voltage level of a steering angle signal output from the differential circuit 51 and determines an analog steering angular velocity based on the obtained voltage level (S22). The damping force determining portion 412 then determines a damping force corresponding to the analog steering angular velocity using the damping force determining table similarly to step S4 (S23).

After step S4 or S23, the adjusting portion 413 determines a current value I0 based on the determined damping force (S5). Operation after step S5 is the same as that in FIG. 8.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A saddle riding type vehicle comprising:
a vehicle body frame;
a head pipe attached to a front end of the vehicle body frame;
a steering shaft provided rotatably in the head pipe;
a detector to detect a steering angle of the steering shaft;
a steering damper; and
a controller programmed to control the steering damper, the controller including a timer counter programmed to decrement time; wherein
the steering damper includes:
an electromagnet arranged around an axis of the steering shaft and including a first surface;
a magnetic member arranged around the axis of the steering shaft and including a second surface opposed to the first surface of the electromagnet; and
a magnetic fluid stored in a gap between the first and second surfaces;
the controller includes:
a steering angular velocity determiner to determine a steering angular velocity based on the steering angle detected by the detector;
an instructor programmed to set the timer counter to a first reference time and to instruct a supply of current to the electromagnet for the first reference time when the determined steering angular velocity exceeds a first reference velocity, and to instruct a stopping or reduction of the current after the first reference time elapses; and
a driver to supply the electromagnet with current in response to an instruction from the instructor.

2. The saddle riding type vehicle according to claim 1, wherein the instructor instructs the driver to supply the electromagnet with current corresponding to the determined steering angular velocity.

3. The saddle riding type vehicle according to claim 2, wherein the steering angular velocity determiner determines the steering angular velocity for every second reference time that is shorter than the first reference time, and the instructor further instructs the driver to stop or reduce the current supply when the determined steering angular velocity becomes less than the first reference velocity before the first reference time elapses after the current supply is started.

4. The saddle riding type vehicle according to claim 1, wherein the instructor further instructs the driver to stop or reduce the current supply when the detected steering angle is greater than a reference steering angle.

5. The saddle riding type vehicle according to claim 2, wherein the detector outputs a steering angle signal corresponding to a rotation of the steering shaft, and the steering angular velocity determiner comprises:

a sampler to sample the steering angle signal in a reference cycle and obtain a plurality of steering angle values; and a determiner to determine a digital steering angular velocity based on the plurality of steering angle values;

the controller further includes a differential circuit to differentiate the steering angle signal and output an analog steering angular velocity value; and the instructor instructs the driver to supply current in a magnitude corresponding to the digital steering angular velocity value when the digital steering angular velocity exceeds a second reference velocity that is higher than the first reference velocity and instructs the driver to supply current in a magnitude corresponding to the analog steering angular velocity value when the digital steering angular velocity value exceeds the first reference velocity and is less than the second reference velocity.

6. A steering damper device for use in a saddle riding type vehicle, the steering damper device comprising:

a steering damper; and a controller programmed to control the steering damper, the controller including a timer counter programmed to decrement time; wherein the steering damper includes:

an electromagnet arranged around an axis of a steering shaft of the saddle riding type vehicle and including a first surface;

a magnetic member arranged around the axis of the steering shaft and including a second surface opposed to the first surface of the electromagnet; and a magnetic fluid stored in a gap between the first surface and the second surface;

the controller includes:

a steering angular velocity determiner to determine a steering angular velocity based on a steering angle of the steering shaft detected by a detector;

an instructor programmed to set the timer counter to a first reference time and to instruct a supply of current to the electromagnet for the first reference time when the determined steering angular velocity exceeds a first reference velocity and to instruct a stopping or reduction of the current supply after the first reference time elapses; and a driver to supply the electromagnet with current in response to an instruction from the instructor.

\* \* \* \* \*